(12) United States Patent
Xu

(10) Patent No.: US 11,340,156 B2
(45) Date of Patent: May 24, 2022

(54) SPECTRUM RECOVERY IN A SAMPLE

(71) Applicant: DATACOLOR INC., Lawrenceville, NJ (US)

(72) Inventor: Zhiling Xu, Princeton Junction, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 0 days.

(21) Appl. No.: 17/034,873

(22) Filed: Sep. 28, 2020

(65) Prior Publication Data

US 2022/0099564 A1     Mar. 31, 2022

(51) Int. Cl.
*G01N 21/27*     (2006.01)
*G06F 17/16*     (2006.01)
*G01N 21/25*     (2006.01)
*G01N 21/31*     (2006.01)

(52) U.S. Cl.
CPC ......... *G01N 21/274* (2013.01); *G01N 21/255* (2013.01); *G01N 21/31* (2013.01); *G06F 17/16* (2013.01)

(58) Field of Classification Search
None
See application file for complete search history.

(56) References Cited

U.S. PATENT DOCUMENTS

| | | | | | |
|---|---|---|---|---|---|
| 5,459,677 | A | * | 10/1995 | Kowalski | G01N 21/274 250/252.1 |
| 5,610,836 | A | * | 3/1997 | Alsmeyer | G01N 21/274 702/27 |
| 5,844,680 | A | * | 12/1998 | Sperling | G01N 21/251 356/303 |
| 9,952,102 | B1 | * | 4/2018 | Xu | G01J 3/462 |
| 10,444,074 | B1 | * | 10/2019 | Xu | G06F 17/16 |
| 10,768,098 | B2 | * | 9/2020 | Xu | G01N 21/25 |
| 2008/0088557 | A1 | * | 4/2008 | Choi | G09G 3/3413 345/88 |
| 2008/0100639 | A1 | * | 5/2008 | Pettitt | G01J 3/524 345/589 |
| 2011/0317149 | A1 | * | 12/2011 | Shimbo | G01J 3/502 356/72 |
| 2013/0182256 | A1 | * | 7/2013 | Kubota | G01J 3/42 356/402 |
| 2019/0391071 | A1 | * | 12/2019 | Xu | G01N 21/255 |

OTHER PUBLICATIONS

U.S. Appl. No. 15/934,044, filed Mar. 23, 2018, Ko Takeuchi.
International Search Report and Written Opinion in corresponding PCT Application No. PCT/US2021/052277, dated Oct. 28, 2021.

* cited by examiner

*Primary Examiner* — Shawn Decenzo
(74) *Attorney, Agent, or Firm* — Leason Ellis LLP

(57) ABSTRACT

A method has been developed to improve the stability of a color measurement system that measures reflectances using matrix-transformation method. The transformation matrix can be obtained by training with a raw measurement matrix and a master reflectance matrix. The raw measurement matrix can be stacked with one or more of its variations, with each variation being some random noise added onto a part or the whole original raw signal matrix. The same number of master reflectance matrices are also stacked to match the size and sample ordering of the raw measurement matrix. The resulting transformation matrix will be more stable and less sensitive to the measurement noise.

17 Claims, 7 Drawing Sheets

SPECTRUM RECOVERY IN A SAMPLE

FIELD OF THE INVENTION

The present invention is directed to apparatus, systems and methods for improving the recovery of transmissive or reflective properties of a sample.

BACKGROUND OF THE INVENTION

There is often a need to determine the transmissive or reflective properties of an object. The color of a sample can be determined by measuring its transmittance or reflectance properties at different wavelengths. For example, it is known to measure light that has been reflected from or transmitted through an object at wavelengths from 400 nm to 700 nm, typically at 10 nm intervals. However, to obtain accurate measurements of the spectrum of an object, a color sensor must have sufficient wavelength channels. Sensors with many wavelength channels (typically 31) produce highly accurate measurements but have cost and complexity drawbacks. Conversely, a sensor with few wavelength channels is cheaper and easier to produce, but such sensors have lower measurement fidelity and produce a less accurate measurement compared to sensors with higher wavelength channels. Specifically, the measurement values obtained by a color measurement device that has a low numbers of wavelength channels will be less accurate compared to the measurement values obtained by a color measurement device having a greater number of wavelength values.

For example, a 6-channel spectral sensor, such as the AS7262, produced by AMS USA of Cupertino, Calif. USA, can be used to measure reflectance spectra. However, such devices are not currently able to obtain a full spectrum of reflectances in the range of 400~700 nm with 10 nm intervals.

One mechanism to compensate for the lack of measurement fidelity is to use matrix transformation, such as described in commonly owned U.S. patent application Ser. No. 15/934,044, herein incorporated by reference in its entirety. As described therein, when using a low measurement fidelity measurement configuration, a series of known transmittance or reflectance color standards can be measured, and through the use of matrix transformation, a full transmittance or reflectance spectrum of the specimen can be recovered. However, using such matrix transformation can, at times, introduce measurement errors, noise or artifacts that yield a recovered spectrum having less than satisfactory results.

There exists in the art a desire to recover full spectral information from only a few spectral channels. For example, the AMS spectral sensor AS7262, produced by AMS AG of Austria, has 6 channels in the visible wavelength range. For example, in U.S. Pat. No. 10,444,074B1 "Spectrum Recovery in a Sample" granted to Zhiling Xu et. al., herein incorporated by reference in its entirety, a matrix transformation method with dual illuminants was utilized to obtain full 400~700 nm spectrum with 10 nm intervals from the 6-channel information.

A big issue of recovering spectral information using matrix transformation is that the result is very sensitive to noise. It will be helpful to have a system that has improved stability and is less sensitive to noise.

Likewise, in commonly owned U.S. Pat. No. 10,768,098B2 "Spectrum Recovery in a Sample", herein incorporated by reference in its entirety, a method was taught to improve the stability of spectrum recovery, however, it requires two or more rounds of measurements. In this new disclosure, a new method was developed that requires only one round of measurement and achieves more stable spectrum recovery.

Thus, what is needed in the art is a system, method and computer implemented products that provide a color measurement system that includes noise reduction functionality and is less susceptible or sensitive to noise. In a further implementation, what is needed are approaches to maintaining or improving the stability of a color measurement system when using matrix-transformation approaches related to the recovery of spectral information.

Furthermore, what is also needed is a solution to the problem introduced by using matrices to correct for inaccuracy of estimation of color values due to a low number of measurement channels.

SUMMARY OF THE INVENTION

In the disclosure provided herein, the apparatus, systems and methods describe recovering spectrum data from low-fidelity sensor configurations through the use of a calibration matrix generated by obtaining a single round of measurements of a collection of calibration standards. Additional measurement matrices are then generated by adding random noise to the measurement matrix. The measurement matrix and its variations are then concatenated thereby resulting in a calibration matrix that, when used in connection with measurement data of an object under analysis, enables the recovery of spectrum data for that object with greater precision and accuracy than would be possible using the low fidelity measurement device alone.

More specifically, the foregoing disclosure is directed to systems and methods for the improvement of the stability of a color measurement system that measures reflectances using matrix-transformation method. The transformation matrix can be obtained by training with a raw measurement matrix and a master reflectance matrix. The raw measurement matrix can be stacked with one or more of its variations, with each variation being some random noise added onto the original raw signal matrix. The same number of master reflectance matrices are also stacked to match the size of the raw measurement matrix. The resulting transformation matrix will be more stable and less sensitive to the measurement noise.

In a particular implementation, a color measurement apparatus is provided that includes one or more evaluative data models trained with measurement values obtained by a low channel color measurement device from a collection of sample color sets. The trained model is configured to transform the measurement values into the values that are produced upon measurement of the same sample color sets by a color measurement device having greater wavelength channels. In one arrangement, a color sensor is used to obtain at least one measurement of a collection of sample color sets under the same illuminants. Random noise, generated by a computer program or other methods, in the form of numerical values, is added to a matrix of the original measurement set to form a perturbed data set. One set of random number can be applied to different units that need to be calibrated. The magnitude of the random noise is usually very small (e.g. 1%) compared to the signal from the sample. The measurement sets are concatenated to produce a more robust calibration matrix. A reference color measurement device having a larger number of wavelength channels is used to measure the collection of color references. The measurement matrix obtained from the measurements made by the reference color measurement device are concatenated to match the number of measurement sets obtained by the color measurement device of the calibration standards. Since each row of the measurement matrix is the result of one sample, instead of adding noise to the measurement of all the samples, random noise can be added to one or more of the rows in the measurement matrix, so the concatenated matrix includes the original measurement matrix and noise-added variations of some of the measurements. The reference measurement matrix needs to be concatenated similarly to match the samples in the measurement matrix. Using the concatenated matrices, a transformation matrix can be derived. Using this transformation matrix, the recovered spectrum vector of a new measurement sample can be obtained.

In yet a further implementation, the transformation value is obtained by deriving the pseudoinverse of a device matrix multiplied by a matrix containing the master calibration measurement matrix value. Here, the device matrix includes a concatenated first and second measurement matrices, where the first measurement matrix is a collection of calibration standards and the second measurement matrix is a matrix of the same measurement values as the first measurement matrix but with random noise added to each measurement.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview and introduction, various embodiments of the apparatus, systems and methods described herein are directed towards color measurement and analysis. The color of a specimen or sample can be determined by measuring its transmittance or reflectance properties at different wavelengths, for example, from 400 nm to 700 nm at 10 nm intervals. To make such measurements requires using a color measurement device (such as a multi-channel color sensor) with a sufficient number of wavelength channels. Color sensors, however, that have a high number of wavelength channels (such as 31 wavelength channels) can be costly. Color sensors that have fewer wavelength channels are more cost efficient, but the resulting color information obtained is generally less accurate. There are various approaches that use matrix transformations to provide estimates of information lost due to the limited scope of wavelength channels. Such approaches, however, can introduce noise or other artifacts into the measurement and calculation of spectra values that results in a recovered spectrum that is not wholly commensurate with the actual properties of a measurement specimen.

Averaging measurement values across a series of measurements of the same calibration standards and generating a transformation matrix based upon the values is one approach to improve the calibration or compensation values used in spectrum recovery. The present apparatus, systems and methods improve upon this approach by using multiple matrices to recover a more accurate representation of the spectrum from a sensor having only a few color channels. In doing so, the apparatus, systems and methods described herein, overcome and solve long standing problems in the technology in innovative and unconventional ways. In part, but in no way limiting, the apparatus, systems and methods provide improved spectrum accuracy and provide a mechanism for low color channel sensors to replicate the functionality provided by color measurement devices having a greater number of color channels.

For example, the apparatus, systems and methods described herein provide a measurement device that utilizes a transformation matrix or model that is built by concatenating at least two measurement matrices of the same calibration standards under the same illuminant(s). By concatenating the calibration measurement matrices, the color measurement device is able to recover spectrum data and produce measurement spectrum data regarding a sample under analysis that has greater measurement fidelity than the raw measurements obtained from a similar low wavelength channel device.

Figure 1A:
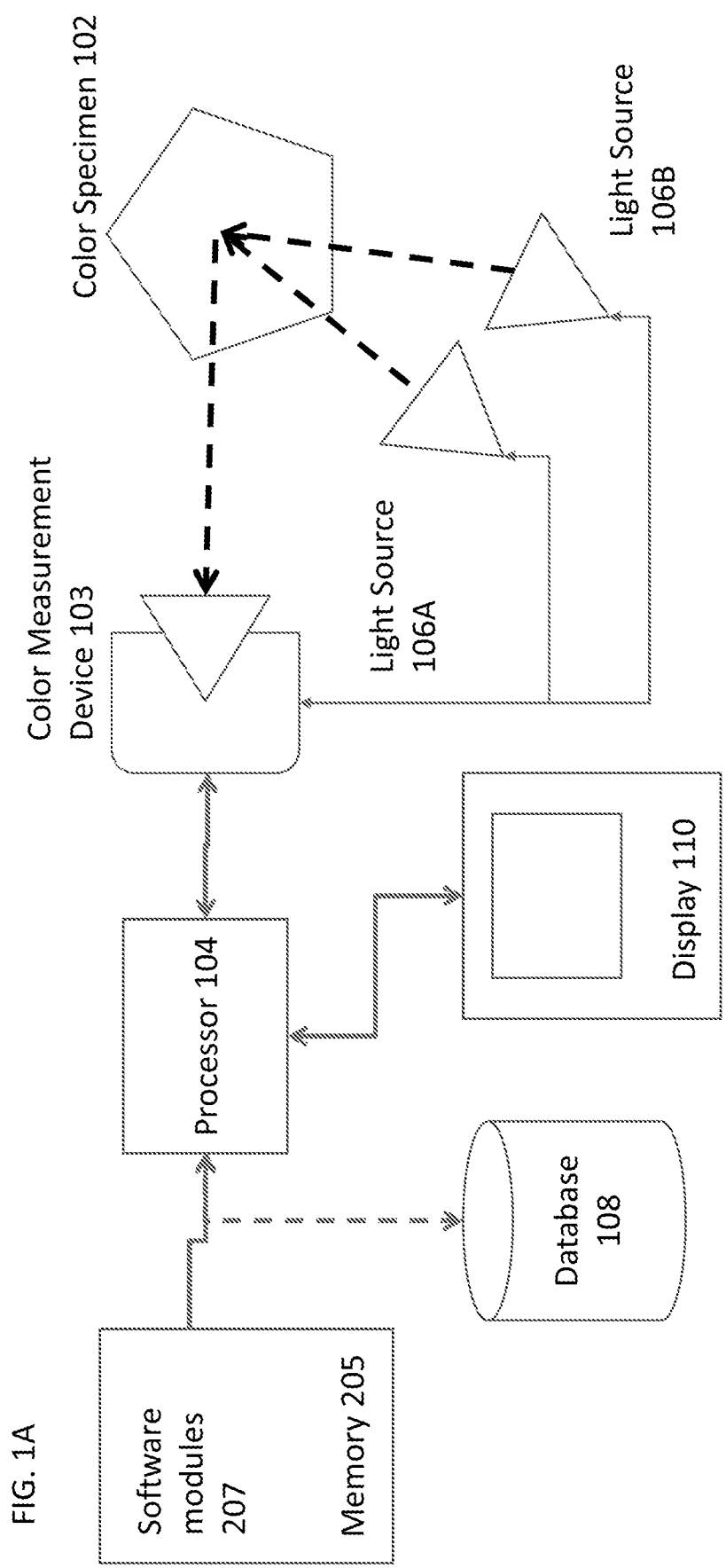
FIGS. 1A-1B illustrate devices and components that interface over one or more data communication networks in accordance with one or more implementations of the present application.

Referring now to the drawings, in which like references numerals refer to like elements, FIG. 1 illustrates devices and components for obtaining color measurement data that interface over one or more data communication networks in accordance with one or more implementations of the present application. As shown, FIG. 1A illustrates a sample 102 under analysis by color measurement device 103, or sensor thereof. Here, the sample 102 can be any type or form of physical article having color or spectral properties in need of analysis. In one implementation, the sample 102 is sample of a material under production having reflective or transmissive properties. For instance, the sample 102 is a fabric sample, such as fleece or fabric blends. In another implementation, the sample 102 is a sheet of translucent or semi-translucent material. In yet a further implementation, the sample 102 is an object or item integral to a larger structure or item, such as a dashboard of an automobile, or a section of wall of a structure. For example, the sample 102 is a section or portion of stucco, carpe, building materials, housing, chassis, packaging, or another item.

With continued reference to FIG. 1A, the color sample 102 is placed such that the color sample 102 can be illuminated by at least one (1) illuminant 106A.

In a further implementation, and for ease of explanation with the examples provided herein, the sample 102 is illuminated by two (2) or more different illuminants. In one or more implementations, the illuminants 106A and 106B are commercially available lighting sources. For instance, the illuminants 106A-B, are separate devices that are configurable to produce a light with certain spectral power distributions. For instance, the light sources 106A-B are one or more discrete light emitting elements, such as LEDs, OLEDs, fluorescent, halogen, xenon, neon, D65 light, fluorescent lamp, mercury lamp, Metal Halide lamp, HPS lamp, incandescent lamp or other commonly known or understood lighting sources. In one arrangement, both light sources 106A and 106B are broad-band LEDs.

In one or more implementations, the illuminants 106A-B include a lens, filter, screen, enclosure, or other elements (not shown) that are utilized in combination with the light source of the illuminants 106A-B to direct a beam of illumination, at given wavelengths, to the sample 102.

In one implementation, the illuminants 106A-B are operable or configurable by an internal processor or other control circuit. Alternatively, the illuminants 106A-B are operable or configurable by a remote processor or control device having one or more linkages or connections to the illuminants 106A-B. As shown in FIG. 1A, the illuminants 106A-B are directly connected to a color measurement device 103.

As further shown in FIG. 1A, the illuminants 106A-B are positioned relative to the sample 102 and color measurement device 103 so as to provide a 45/0, d/8, or other illumination/pickup geometry combination. Where the sample 102 is a transmissive sample, however, the orientation of the illuminants 106A-B relative to the sample 102 and the color measurement device 103 is such that the light beam is directed through the sample 102 to the color measurement device 103.

Continuing with FIG. 1A, light reflected (or in the case of a transmissive sample, transmitted) upon the sample 102 is captured or measured by a color measurement device 103. Here, the color measurement device 103 can be a color sensor or image capture device. For example, the color measurement device 103 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof. In a particular implementation, the color measurement device 103 is a 6-channel AMS spectral sensor, such as the AS7262 produced by AMS USA of Cupertino, Calif. USA.

In a particular implementation, the color measurement device 103 is configured to generate an output signal upon light being striking the color measurement device 103 or a light sensing portion thereof. By way of non-limiting example, the color measurement device 103 is configured to output a signal in response to light that has been reflected off of the sample striking a light sensor or other sensor element integral or associated with the color measurement device 103. For instance, the color measurement device 103 is configured to generate a digital or analog signal that corresponds to the wavelength or wavelengths of light that a light sensor integral to the color measurement device 103 after being reflected off of the sample 102. In one or more configurations, the color measurement device 103 is configured to output spectral information, RGB information, or another form of multi-wavelength data representative of light reflected off, or transmitted through, the sample 102.

In one or more implementations, the color measurement device 103 described herein, has less than 31 optical, NIR or other wavelength channels to evaluate a given wavelength range. In a further implementation, the color measurement device 103 has less than 15 wavelength channels to evaluate a given wavelength range. In a non-limiting example, the color measurement device 103 has six (6) wavelength channels to evaluate a given wavelength range.

In one non-limiting implementation, the color measurement device 103 is a camera or image recording device integrated into a smartphone, tablet, cell phone, or other portable computing apparatus. In a further embodiment, the color measurement device 103 is an "off the shelf" digital camera or web-camera connected or in communication with one or more computing devices.

The color measurement device 103, in accordance with one embodiment, is a stand-alone device capable of storing local data corresponding to measurements made of the sample 102 within an integrated or removable memory. In an alternative implementation, the color measurement device 103 is configured to transmit one or more measurements to a remote storage device or processing platform, such as processor 104. In configurations calling for remote storage of image data, the color measurement device 103 is equipped or configured with network interfaces or protocols usable to communicate over a network, such as the internet.

Alternatively, the color measurement device 103 is connected to one or more computers or processors, such as processor 104, using standard interfaces such as USB, FIREWIRE, Wi-Fi, Bluetooth, and other wired or wireless communication technologies suitable for the transmission measurement data.

The output signal generated by the color measurement device 103 is transmitted to one or more processor(s) 104 for evaluation as a function of one or more hardware or software modules. As used herein, the term "module" refers, generally, to one or more discrete components that contribute to the effectiveness of the presently described systems, methods and approaches. Modules can include software elements, including but not limited to functions, algorithms, classes and the like. In one arrangement, the software modules are stored as software 207 in the memory 205 of the processor 104. Modules also include hardware elements substantially as described below. In one implementation, the processor 104 is located within the same device as the color measurement device 103. However, in another implementation, the processor 104 is remote or separate from the color measurement device 103.

In one configuration, the processor 104 is configured through one or more software modules to generate, calculate, process, output or otherwise manipulate the output signal generated by the color measurement device 103.

In one implementation, the processor 104 is a commercially available computing device. For example, the processor 104 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 can comprise a single processor, multiple discrete processors, a multi-core processor, or other type of processor(s) known to those of skill in the art, depending on the particular embodiment. In a particular example, the processor 104 executes software code on the hardware of a custom or commercially available cellphone, smartphone, notebook, workstation or desktop computer configured to receive data or measurements captured by the color measurement device 103 either directly, or through a communication linkage.

The processor 104 is configured to execute a commercially available or custom operating system, e.g., MICROSOFT WINDOWS, APPLE OSX, UNIX or Linux based operating system in order to carry out instructions or code.

In one or more implementations, the processor 104 is further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

The processor 104 is configured to store data either locally in one or more memory devices. Alternatively, the processor 104 is configured to store data, such as measurement data or processing results, in a local or remotely accessible database 108. The physical structure of the database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable the processor 104 to retrieve and store data within the database 108.

In one implementation, each element provided in FIG. 1A is configured to communicate with one another through one or more direct connections, such as through a common bus. Alternatively, each element is configured to communicate with the others through network connections or interfaces, such as a local area network LAN or data cable connection. In an alternative implementation, the color measurement device 103, processor 104, and database 108 are each connected to a network, such as the internet, and are configured to communicate and exchange data using commonly known and understood communication protocols.

In a particular implementation, the processor 104 is a computer, workstation, thin client or portable computing device such as an Apple iPad/iPhone® or Android® device or other commercially available mobile electronic device configured to receive and output data to or from database 108 and or color measurement device 103.

In one arrangement, the processor 104 communicates with a local or remote display device 110 to transmit, displaying or exchange data. In one arrangement, the display device 110 and processor 104 are incorporated into a single form factor, such as a color measurement device that includes an integrated display device. In an alternative configuration, the display device is a remote computing platform such as a smartphone or computer that is configured with software to receive data generated and accessed by the processor 104. For example, the processor is configured to send and receive data and instructions from a processor(s) of a remote computing device. This remote computing device 110 includes one or more display devices configured to display data obtained from the processor 104. Furthermore, the display device 110 is also configured to send instructions to the processor 104. For example, where the processor 104 and the display device are wirelessly linked using a wireless protocol, instructions can be entered into the display device that are executed by the processor. The display device 110 includes one or more associated input devices and/or hardware (not shown) that allow a user to access information, and to send commands and/or instructions to the processor 104 and the color measurement device 103. In one or more implementations, the display device 110 can include a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, adaptors, and/or other elements used to supply power and interconnect electronic components and control activations are appreciated and understood to be incorporated.

Figure 2A:
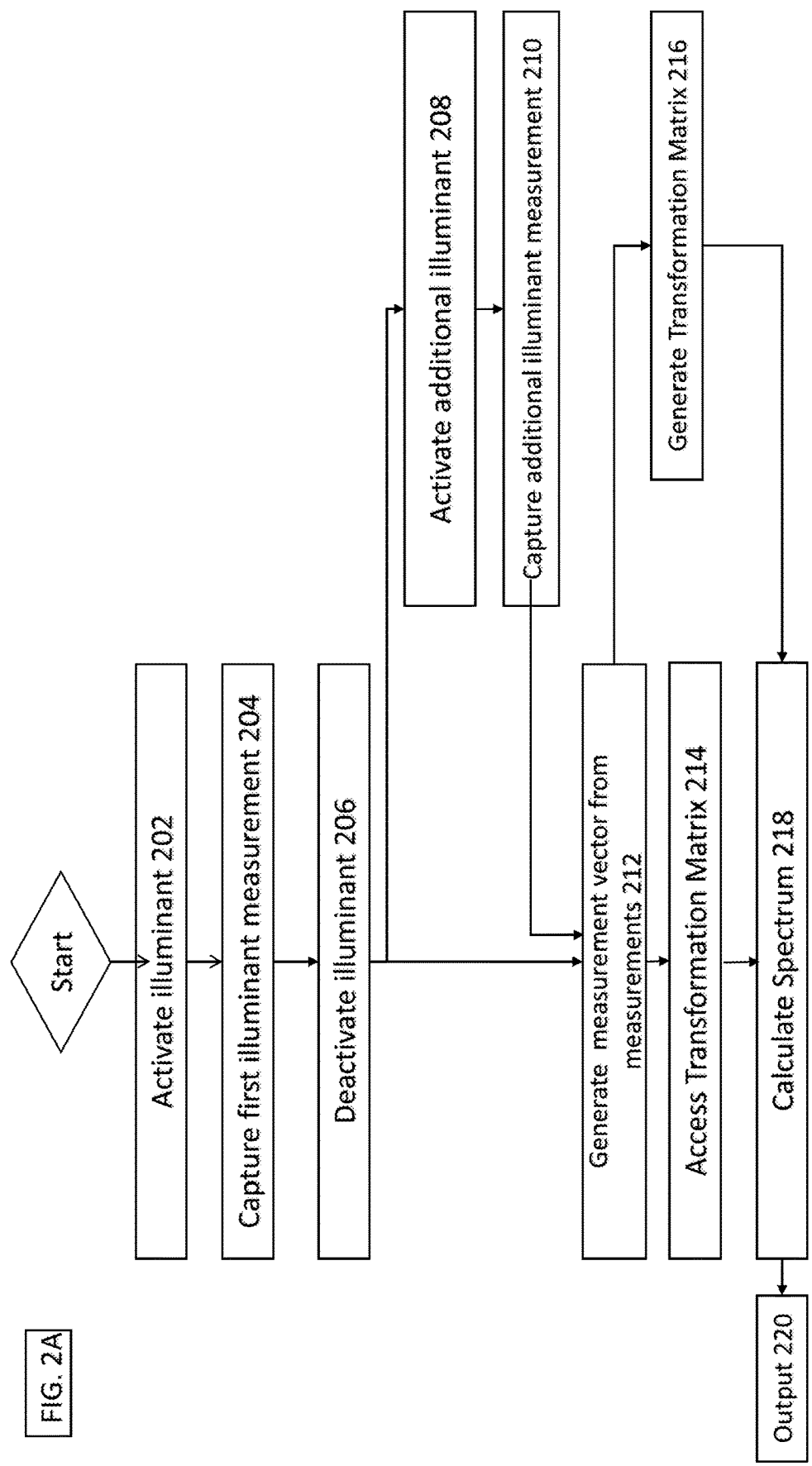
FIGS. 2A-2B present a flow diagram detailing the steps taken in one configuration of the color measurement system according to one embodiment of the present application.
Figure 3:
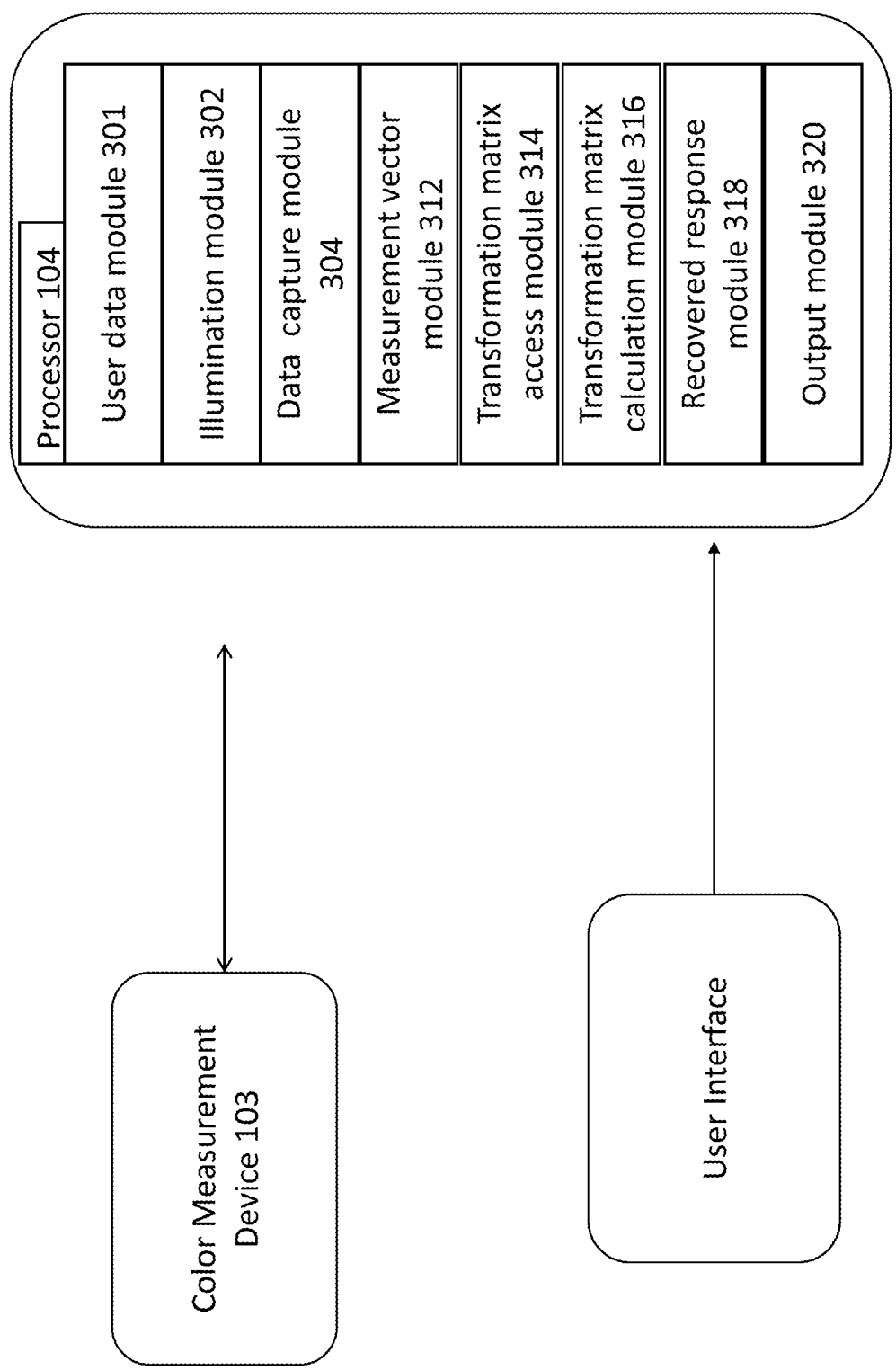
FIG. 3 presents a collection of modules detailing the operative functions of the color measurement system according to one configuration of the present invention.

Turning now to the overview of the operation of the system described in FIGS. 2A and 3, the processor 104 is configured to implement or evaluate the output of the color measurement device 103. With particular reference to FIG. 2A, in order to acquire measurements of the sample 102 under one or more (such as two) illuminants, a color measurement of the sample 102 is made under a first illuminant as shown in illuminant activation step 202. Here, one or more control signals, sent in one particular implementation by the processor 104 or color measurement device, causes one of the illuminants 106A-B to activate, thereby sending light of a given SPD to the sample 102. In a particular configuration, one or more illumination modules 302, configured as code executing within the processor 104 configure the processor 104 to activate the desired illuminant. In one or more configurations, the illuminants 106A-B is a broad-band light source, or a light source that includes multiple sub-lighting elements, each capable of emitting a light with a given SPD. Here, one or more submodules of the illumination module 302 configures the processor 104 to select the desired wavelength or light source available to the illuminants 106A-B.

As shown with reference to FIG. 3, in one implementation, the user data module 301 is configured to receive, from one or more input devices, the user's desired selection, operational parameters, control flags, data or other information. For example, the user data module 301 is configured to receive data from the display device 110 that has been input by the user. This data can, in one implementation, include a desired process, procedure or parameters to implement. The user data module 301 includes hardware and/or software that configures the processor 104 to receive and interpret user supplied data.

In response to user data that signals the start of a data capture session, the illumination module 302 configures the processor 104 to activate one or more illuminants. In one arrangement, the illumination module 302 can include hardware and/or software that allows the processor 104 to receive instructions for operating the one or more illuminants. The illumination module 302 configures the processor 104 to receive and interpret user input sent by way of the user data module 301. As shown with reference to FIG. 3, in one implementation, the illumination module 302 is configured to select the illuminant based on user input. The illumination module 302 includes hardware and/or software that configures the processor 104 to provide a control signal to one or more illuminants. The illumination module 302 further can include hardware and/or software that allows the processor 104 to receive instructions for operating the one or more illuminants. For instance, the illumination module 302 configures the processor 104 to receive and interpret user input sent by way of the user data module 301. For example, upon receiving user input regarding the type, nature or category of sample, the illumination module 302 configures the processor 104 to automatically select one or more illuminants from the available illuminants to illuminate the sample 102 based on internal rules, algorithms or lookup tables that correlate sample type to illuminant type or selection.

Upon illumination by the first illuminant, the light returned from the sample 102 is directed to the color measurement device 103. In response to light that have be reflected off the sample striking a light sensing portion of the color measurement device 103, a signal or output is generated that includes information about the sample 102 under analysis. The output or signal is received by the processor 104 as in measurement capture step 204.

Here, a measurement data capture module 304 configures a processor 104 to capture or record the output of the color measurement device 103. Measurement data capture module 304 includes hardware and/or software that configure the processor 104 to obtain, store, secure or make available data. In one implementation, the output captured by the processor 104 configured by a measurement data capture module 304 is composed of a pixel data array, analog signal (or signals), digital data stream, data file, serial encoding, binary data, or other information suitable to contain information about the light that has been reflected off of the sample 102 and received by the color measurement device 103.

In a further implementation, one or more submodules of the measurement data capture module 304 configures the processor 104 to convert, format or otherwise condition the data received from the color measurement device 103. For example, a submodule of the measurement data capture module 304 converts the data from a raw binary data to a digital file.

In a particular implementation, the data captured by the color measurement device 103 is stored within a memory of the processor 104. Alternatively, the data relating to the measurements made of the sample 102 under any of the illuminants 106A-B are stored on a remote database 108 for later retrieval or processing. In yet a further implementation, data regarding the specific make, model, brand, and settings of the color measurement device 103 are stored along with the measurement data.

In a further implementation, the characteristics of the illuminants 106A-B are also stored along with the measurement data. For instance, the processor 104 is configured to activate the illuminants 106A-B in order to record measurement data output by the color measurement device 103 and access the properties of the illuminant 106A-B used. One or more submodules of the measurement data capture module 304 configure the processor 104 to access data regarding the activated illuminant from a look up table or database of illuminants 106A-B. Through one or more additional submodules of the measurement data capture module 304, the processor 104 is configured to associate the characteristics of the specified illuminant 106A-B with the relevant measurement data.

As shown in illuminant deactivation step 206, the processor 104 is configured by one or more submodules of the illumination module 302 to deactivate an illuminant. As noted, the described apparatus, system and methods are operable with a single illuminant. As such, from illuminant deactivation step 206, the processor can proceed directly to measurement vector generation step 212. However, in alternative configurations where multiple illuminants are used, the processor 104 is also configured by one or more submodules of the illumination module 302 to activate an additional illuminant as shown with respect to the dashed lines pointing to additional illuminant activation step 208. Here, the processor 104 is configured by one or more modules cooperating with one another to determine the appropriate or desired illuminants 106A-B. For example, the user input stored or accessible by the user data module 301, configures the processor 104 to select a given illuminants 106A-B based on the type of material under analysis.

Once the first measurement(s) under the first illuminant have been made and the illuminant is deactivated, a second illuminant is activated as in additional illuminant activation step 208. For instance, upon receiving a ready or available flag from the color measurement device, the processor 104 is configured by the illumination module 302 (or a submodule thereof) to activate the second illuminant as shown in additional illuminant activation step 208.

The processor 104 is configured to receive the output of the color measurement device 103 generated when light that has been reflected off of the sample 102 strikes a light sensing portion thereof. Upon illumination of the sample 102 under the second illuminant, the processor 104 is configured by the measurement data capture module 304 to obtain the output of the color measurement device 103 using the second illuminant, as shown in additional illuminant capture step 210.

In one or more particular implementations, further illuminants are used to capture additional data relating to the sample 102 under different wavelengths. In this arrangement, the processor 104 is configured to return to illuminant deactivation step 206 and proceed to additional illuminant capture step 210. For instance, where the user data module 301 configures the processor 104 to capture measurement data under each illuminants 106A-B available to the system or apparatus so described, the processor 104 iterates through steps 206-210 until each illuminants 106A-B has illuminated the sample 102 and corresponding data has been captured and/or stored in the local or remote memory 205.

Using the measurement data obtained under at least the first illuminant (directly from illuminant deactivation step 206, or by way of additional steps 208-210), a measurement vector for the measured (reflectance or transmittance) values of the sample 102 are generated as shown in step 212. For example, the processor 104 is configured by a measurement vector module 312 to access the stored values relating to the measurements obtained under one or more illuminants. The measurement vector module 312 includes hardware and/or software that configures the processor 104 with the necessary operational parameters to generate and/or calculate matrices or other mathematical constructs. In one or more further implementations, measurement vector module 312 further configures the processor 104 to access and/or store one or more matrices that are used in the generation of the recovered spectrum for the sample.

By way of non-limiting example, the processor 104 is configured to generate a recovered spectrum for a sample under analysis using a measurement vector $T=(t_1 \ldots t_n \; 1)$, where $t_n$ is the sensor raw counts of the sample on the $n^{th}$ channel obtained from the light or color measurement device 103. The constant value, 1, is added at the end of vector T for offset compensation. For example, the measurement vector module 312 configures the processor 104 to adjust or update the values obtained by measuring the sample 102, under one or more illuminants, to introduce the compensation value. By way of ease of explanation and description, the offset compensation value added to the measurement vector T in measurement vector generation step 212 has a value of 1. However, it should be appreciated that in one or more implementations, the measurement vector module 312 configures one or more processors 104 to obtain an offset compensation value from a data store. For example, a submodule of the measurement vector module 312 configures the processor 104 to obtain an offset compensation value to be used in the measurement vector from a look-up list of other data storage location.

Continuing with the flow diagram of FIG. 2, the input vector T is multiplied by a transformation value M in order to obtain the converted spectrum at each wavelength. In one or more further implementations, as shown in transformation matrix access step 214, the transformation value M is a matrix obtained from a data store or database. For example, as shown in transformation matrix access step 214, a processor 104 configured by the transformation matrix access module 314, accesses a suitable transformation matrix M from a database 108.

Using the measurement vector T and the accessed transformation matrix M, a spectrum RDconvert can be obtained for the sample 102 by evaluating the measurement vector with a transformation matrix M according to:

$$R_{convert}=(v_1 \ldots v_p)=T*M, \quad (1)$$

where $v_p$ is the recovered reflectance of the sample at wavelength p.

In an alternative implementation, the described system and method are configured to generate a transformation matrix M from one or more calibration standards. For example, a transformation matrix M can be generated prior to, or after, the measurement of the sample 102. In one implementation, as shown in transformation matrix generation step 216, a transformation matrix M is generated. Here a processor 104 is configured by the transformation matrix calculation module 316 to carry out the transformation matrix generation process. In an alternative configuration, the process for generating the transformation matrix M is separate and independent from the color measurement steps outlined is FIG. 2A.

Figure 2B:
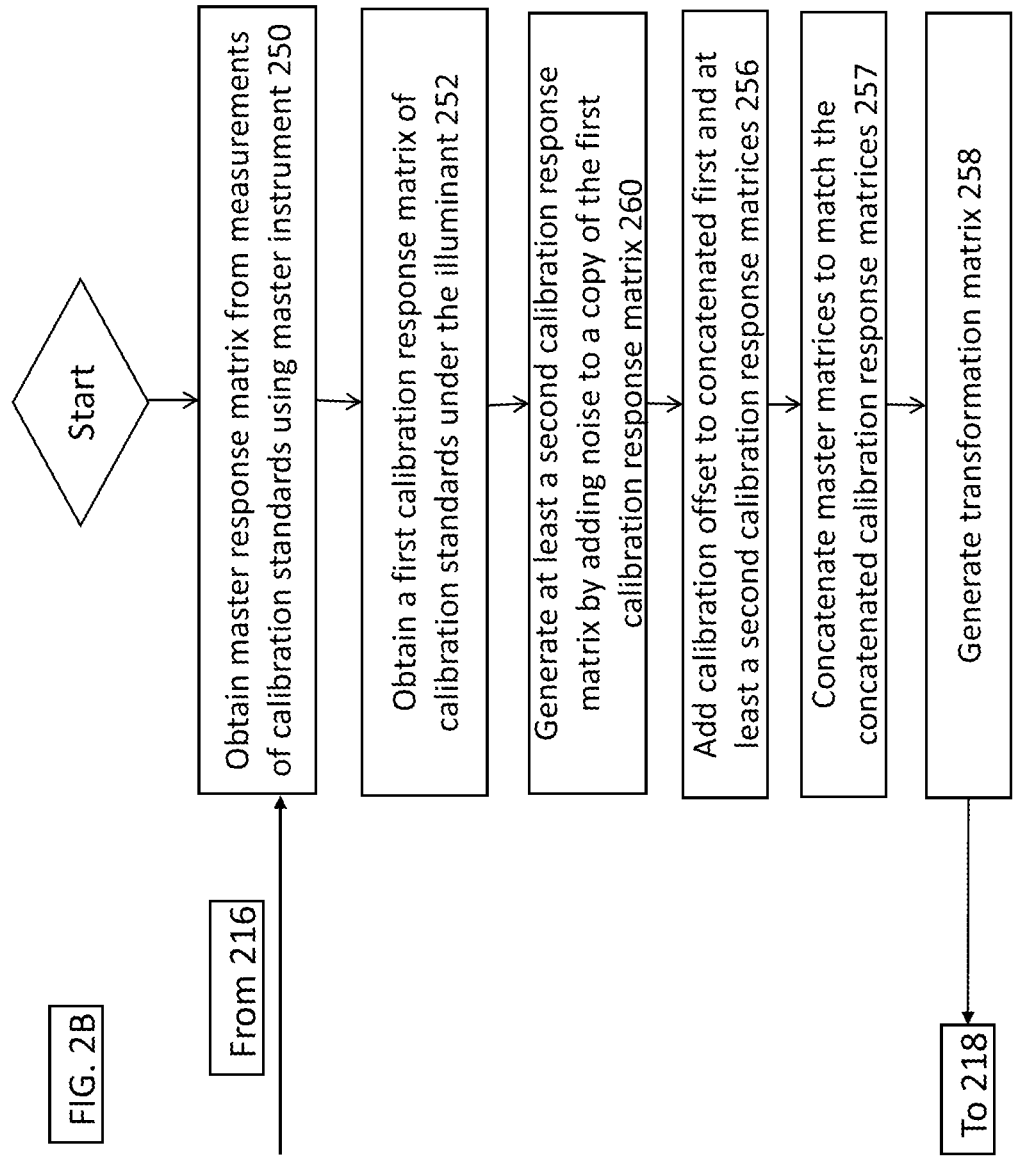

For example, as shown in FIG. 2B, the process for generating the transformation matrix M can be initiated as a collection of sub-steps of transformation matrix generation step 216. In an alternative configuration, the transformation matrix M is generated using as standalone process such that the transformation matrix is output to a database or data store to later access from the processor 104 in a process that is independent from the spectrum recovery process.

Continuing with the process outlined in the flow diagram of FIG. 2B, the transformation matrix M is generated by obtaining measurements of a collection of calibration standards using a control or master measurement instrument. By way of non-limiting example, as shown in master instrument capture step 250, the reflectances of at least 12 BCRA tiles are obtained using a master or control instrument. In one or more instances, the master or control instrument is configured with a greater number of measurement channels than the color measurement device 103 used to obtain the measurement vector T. In one implementation, the master or control instrument is the "800 Spectrophotometer" manufactured and sold by Datacolor Inc. However, alternative color measurement or spectrophotometers are understood and appreciated. In one implementation, the master or control spectrophotometer has 31 color measurement channels.

Continuing with the present example, the control or master measurement device is used to obtain measurement of 12 BCRA tiles. The measurements obtained of the BCRA tiles obtained by the master measurement device are used to generate master reflectance matrix R:

$$R = \begin{pmatrix} r_{1,1} & \cdots & r_{1,p} \\ \vdots & \ddots & \vdots \\ r_{m,1} & \cdots & r_{m,p} \end{pmatrix}, \quad (2)$$

where $r_{m,p}$ is the reflectance of tile m at wavelength p.

In one implementation, the value for R is stored in one or more data storage devices. For example, in one or more arrangements, the data obtained by the control or master color measurement device is stored in a database or data storage location accessible to the processor 104, or another computing device. In a particular implementation, one or more submodules of the transformation matrix calculation module 316 configures a processor 104 to access a data storage location and store R for later use or access.

Figure 1B:
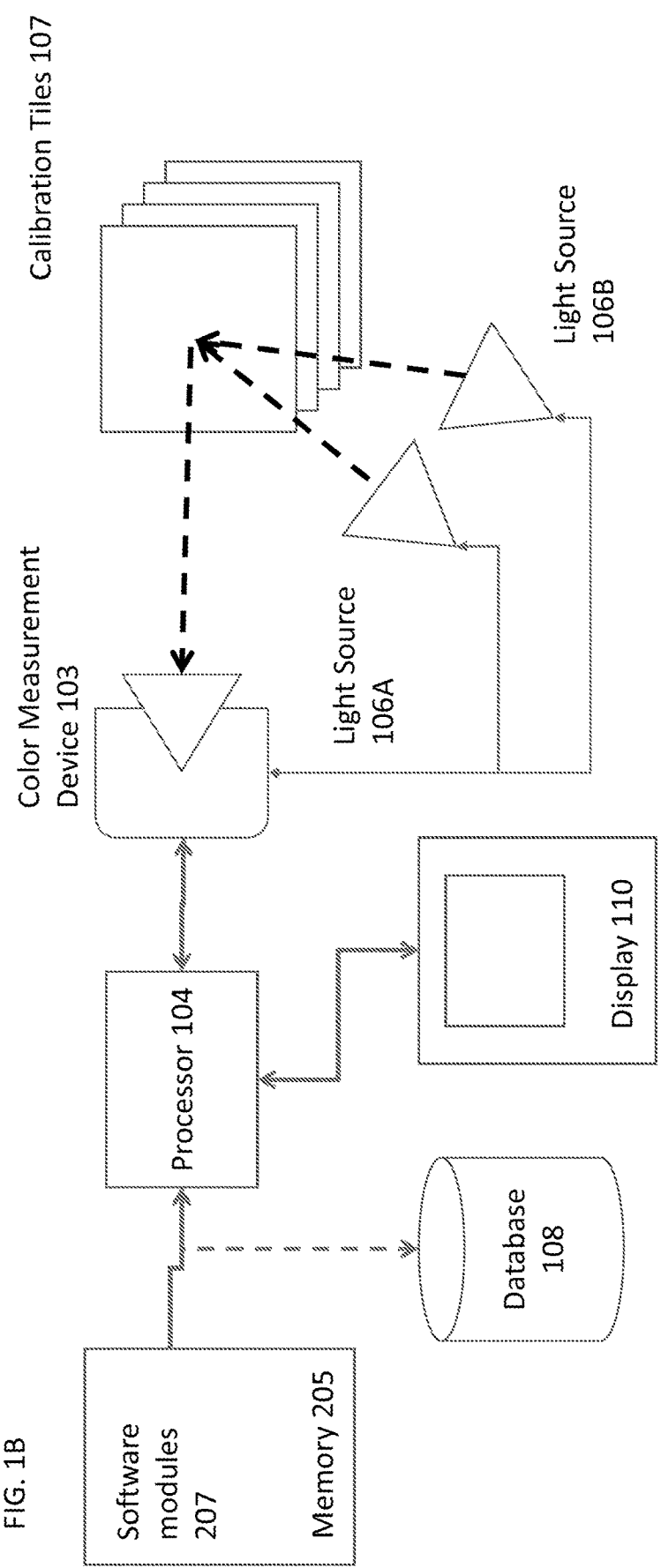

As shown FIG. 1B and FIG. 2B, the same BCRA tiles measured using the master instrument in step 250 are also measured using the same or similar color measurement device 103 used to measure the sample 102.

By way of further example, where the color measurement device 103 is used to measure the BCRA tiles and includes at least one (1) illuminant, the BCRA tiles are measured under the first illuminant (as in first illuminant color calibration step 252). Where additional illuminants are used, for example a second illuminant, and the BCRA tiles are measured under the second illuminant (as in second illuminant color calibration step 254). By way of further example, where the sensor used in a light measurement device (such as color measurement device 103) includes 6 sensor channels, the use of two illuminants provides for a 12-channel sensor result. As such when each of the BCRA tiles are measured using such a configuration illustrated in FIG. 1B, the result for each of the BCRA tile can be used to generate a calibration response matrix having 12 rows. However, generally, the calibration response matrix can be described according to S:

$$S = \begin{pmatrix} s_{1,1} & \cdots & s_{1,n} & 1 \\ \vdots & \ddots & \vdots & \vdots \\ s_{m,1} & \cdots & s_{m,n} & 1 \end{pmatrix}, \quad (3)$$

where S is the sensor response matrix, and $s_{m,n}$ is the sensor reading of tile m at channel n. In one or more further implementations, the transformation matrix calculation module 316 includes one or more submodules that configure a processor (such as, but not limited to, processor 104) to apply an offset compensation value to the end of the each row of the sensor response matrix, as shown in an offset calibration step 256. As provided in EQU. 3, the offset compensation value added to the end of the row is the constant value 1. However, it will be appreciated that processor (such as but not limited to processor 104) is configured to introduce other offset values into the response matrix. Furthermore, while the offset value in EQU. 3 is the same offset value used in obtaining measurement vector T, the described approach does not necessitate that the same value be added at the end of each row of the respective vector and matrix. As such different offset values can be used in measurement vector T and response matrix S.

As shown in transformation matrix generation step 258, the matrices R and S obtained in steps 250-252 (and in some implementations 254) are used to obtain the transformation matrix M according to the following equation:

$$M = \text{pinv}(S) * R, \tag{4}$$

For example, one or more processors are configured by the transformation matrix calculation module 316 to access the stored values for R and S and generate M according to EQU. 4. Once matrix M is generated, it is output for use in the recovery measurement process (as shown in recovered spectrum calculation step 218) or stored in one or more data storage devices for later use or retrieval. For example, once the transformation matrix M is generated, the matrix can be used to recover the spectrum of the sample under the illuminants using EQU. 1, as shown in recovered spectrum calculation step 218.

Figure 4:
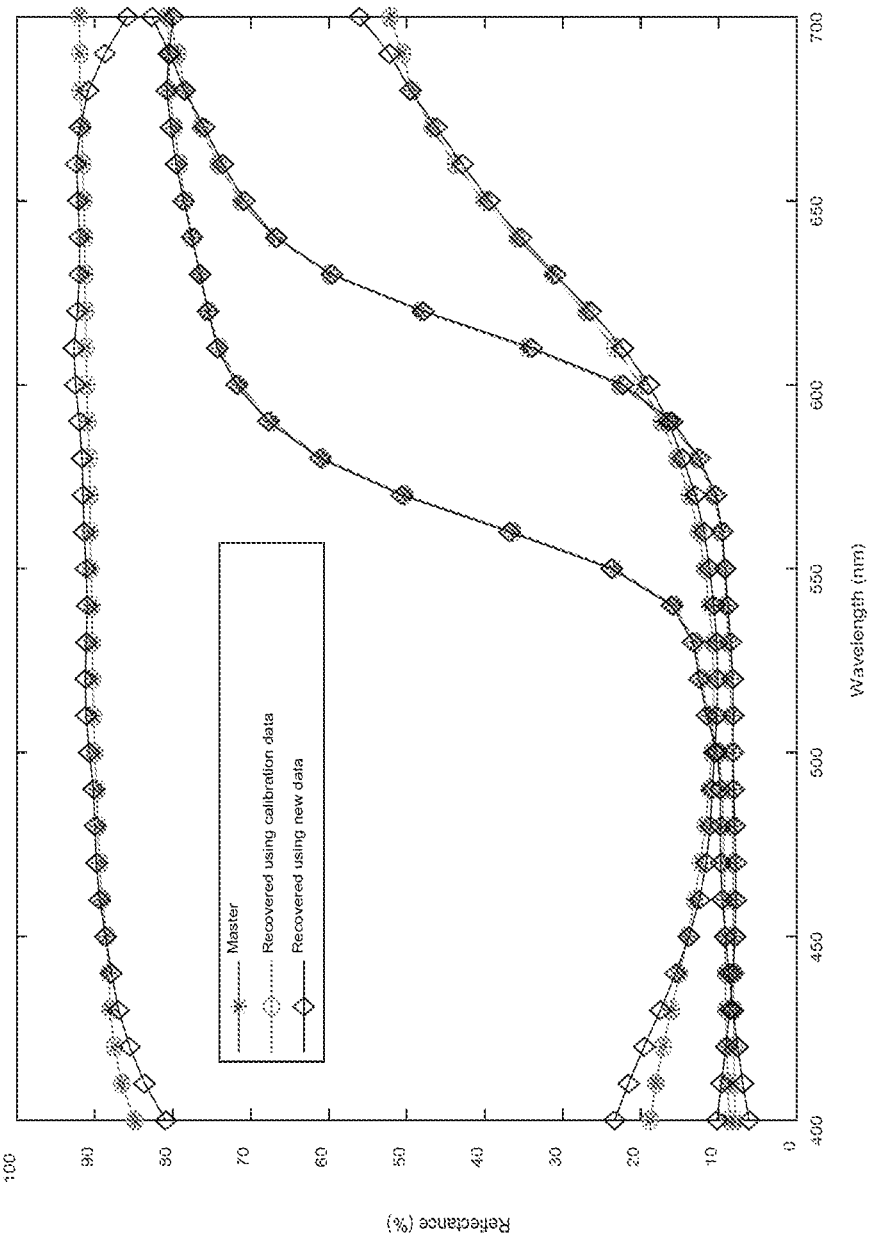
FIG. 4 is a graph detailing the reflectance comparison of one configuration of the calibration device.

It will be appreciated that, as shown in the plot of FIG. 4, the recovered spectrum using EQU. 4 provides an approach that allows for reflectance data to be recovered using the calibration data. However, when transformation matrix M is used to obtain new reflectances information of a new sample, the accuracy of the recovered spectrum can still be improved. In the plot of FIG. 4, the red star lines show the master reflectances of the several BCRA tiles measured with the master or control instrument (such as in step 250). The green circle lines show the recovered reflectances of the same BCRA tiles using the calibration sensor data as the measurement data, and the blue diamond lines show the recovered reflectances of the same BCRA tiles using the new sensor data as the measurement data. As shown in the cart of FIG. 4, the new sensor data does not produce as accurate results as the calibration sensor data.

Thus, to solve the instability of the matrix and obtain a more accurate measurement of the sample, additional data can be added to the calibration data set. As shown in additional color calibration matrix step 260, a new set of calibration data is added to the sensor response matrix. For example, the transformation matrix calculation module 316, or a submodule thereof, is configured to generate a more robust calibration response matrix S2 by including additional data. Such additional data is obtained by using the data obtained from the BCRA tiles measured in step 252 (and in some implementations 254) to obtain a second response matrix. For example, the data obtained in step 252 (and in some implementations 254) can be duplicated and then adjusted to generate additional matrices for use in the calibration calculations. By increasing the amount of information within the calibration response matrix, the stability of the calibration matrix is improved. Furthermore, by improving the stability of the calibration matrix a more accurate returned spectra measurement of the sample under analysis can be obtained without the need to increase the number of sensor channels or illuminants.

By way of example, a processor (such as but not limited to processor 104) is configured by one or more submodules of the transformation matrix calculation module 316 to generates a more robust calibration matrix using the standard BRCA tiles according to:

$$S2 = \begin{pmatrix} s_{1,1} & \cdots & s_{1,n} & 1 \\ \vdots & \ddots & \vdots & \vdots \\ s_{m,1} & \cdots & s_{m,n} & 1 \\ x_{1,1} & \cdots & x_{1,n} & 1 \\ \vdots & \ddots & \vdots & \vdots \\ x_{m,1} & \cdots & x_{m,n} & 1 \end{pmatrix}, \tag{5}$$

where S2 is the new, more robust, sensor response matrix, $s_{m,n}$ is the sensor reading of tile m at channel n in the calibration matrix, and $x_{m,n}$ is the same sensor reading of $s_{m,n}$ with random noise added to the measurements obtained in the round of measurement. In one particular implementation, the random noise is added by one or more submodules of the transformation matrix calculation module 316. For instance, the transformation calculation module 316 is configured to add random noise in the form of random numerical values added to each of the original measurement set in order to generate a second, perturbed data set of measurements. That is, for each measurement result in the measurement matrix, a corresponding perturbed measurement value can be generated by adding a random numerical value to each respective measurement result.

In one or more implementations, the transformation matrix calculation module 316, or a submodule thereof, is configured to add a random numerical value such that the difference between the measurement value and the corresponding perturbed measurement is about 1%. However, in one or more implementations, the difference between a measurement value in the first measurement set and the corresponding perturbed measurement value can be between 0.05% and 2% of the measurement value in the first measurement set.

In a particular implementation, more than one perturbed measurement set can be generated. In this configuration, the random numerical values added to each perturbed set is different. For example, a first perturbed measurement set will have a first random value added to the measurements of the first measurement set, while a second perturbed measurement set will have a second random value added to the measurement values of the first measurement set such that the first and second values are different.

In yet another implementation, the perturbed measurement set may include only one or more rows in the actual measurement set with random noise added. In this case, the reference measurement matrix and a part of it needs to be concatenated similarly to match the samples in the measurement matrix.

Here, the processor (such as but not limited to processor 104) configures the color measurement device 103 to make a first measurement of the BCRA tiles under the first and second illuminants, and then obtain a second round of measurement by adding random numerical values. As shown in the above equation, a constant value, added at the end of each row, provides an offset calibration value to the matrices. As shown in offset calibration step 256, an offset value can be selected from a data storage location or other database and added to the end of each row of the more robust matrix. By way of clarification, the above robust sensor response matrix S2 is generated using the measurements of a measurement device having 6 channels and two different illuminants in order to provide the 12 measurement channels referenced in total. Those possessing an ordinary level of skill in the requisite art will appreciate that alternative sensors (with greater or fewer measurement channels) and illuminants would alter the structure of the robust sensor response matrix.

Turning now to transformation matrix generation step 258, the transformation matrix calculation module 316 is configured to generate the transformation matrix using the more robust sensor response matrix. However, in order to provide for a stable transformation matrix, the master reflectance matrix is updated to match the more robust senor response matrix. For example, where the more robust sensor response matrix includes two (2) rounds of measurements of the BCRA tiles, the robust master reflectance matrix is provided as:

$$R2 = \begin{pmatrix} R \\ R \end{pmatrix}, \quad (6)$$

where R is the master reflectance matrix obtained in step as shown in equation (2).

Continuing with transformation matrix generation step 258, using these more robust matrices (R2 and S2) a more robust transformation measurement matrix can be generated according to a revised form of EQU 3. For example, the transformation matrix calculation module 316 configures a processor (such as but not limited to processor 104) to generate the more robust transformation matrix M according to:

$$M = \text{pinv}(S2) * R2, \quad (7)$$

Once the more robust transformation matrix is generated according to transformation matrix generation step 258, the transformation matrix is provided as an input to EQU 1 in order to calculate the recovered spectrum of any sample 102 as in recovered spectrum calculation step 218. For example, the sample recovery module 318 configures a processor (such as processor 104) to use the transformation matrix of EQU. 7 and the measurement vector obtained in measurement vector generation step 212 to generate the obtained sensor response for the sample 102 measured.

Once the recovered spectrum has been obtained according to recovered spectrum calculation step 218, the data values associated with the spectrum recovery process (for example, the recovered spectrum as well as the measurement matrix and transformation matrix) are output by a processor configured by an output module 320 to one or more output devices as in output step 220. In one implementation, the recovered spectrum is output to a display device 110 of a smart phone or tablet.

In this configuration, the measurements and outputs are carried out by one or more processors that are linked or connected to a color measurement device 103. The color measurement device 103 is in turn linked to one or more computers or mobile computing platforms. For example, the color measurement device 103 and illuminants 106A-B are enclosed in a single housing or device. This color measurement device 103 is configured by one or more data linkages to exchange data with a mobile computer or computing platform. For example, the color measurement device is configured to communicate with a mobile computing device using Bluetooth or other wireless protocols to allow for data and measurements obtained about the sample 102 to be passed to the mobile device for further analysis or computation. The results of such an analysis or computation are displayed on one or more screens or display devices of the mobile computer or mobile computing platform.

In another implementation, the output module 320 configures the recovered spectrum to be output to a display device 110 integral to the color measurement device 103.

Figure 5:
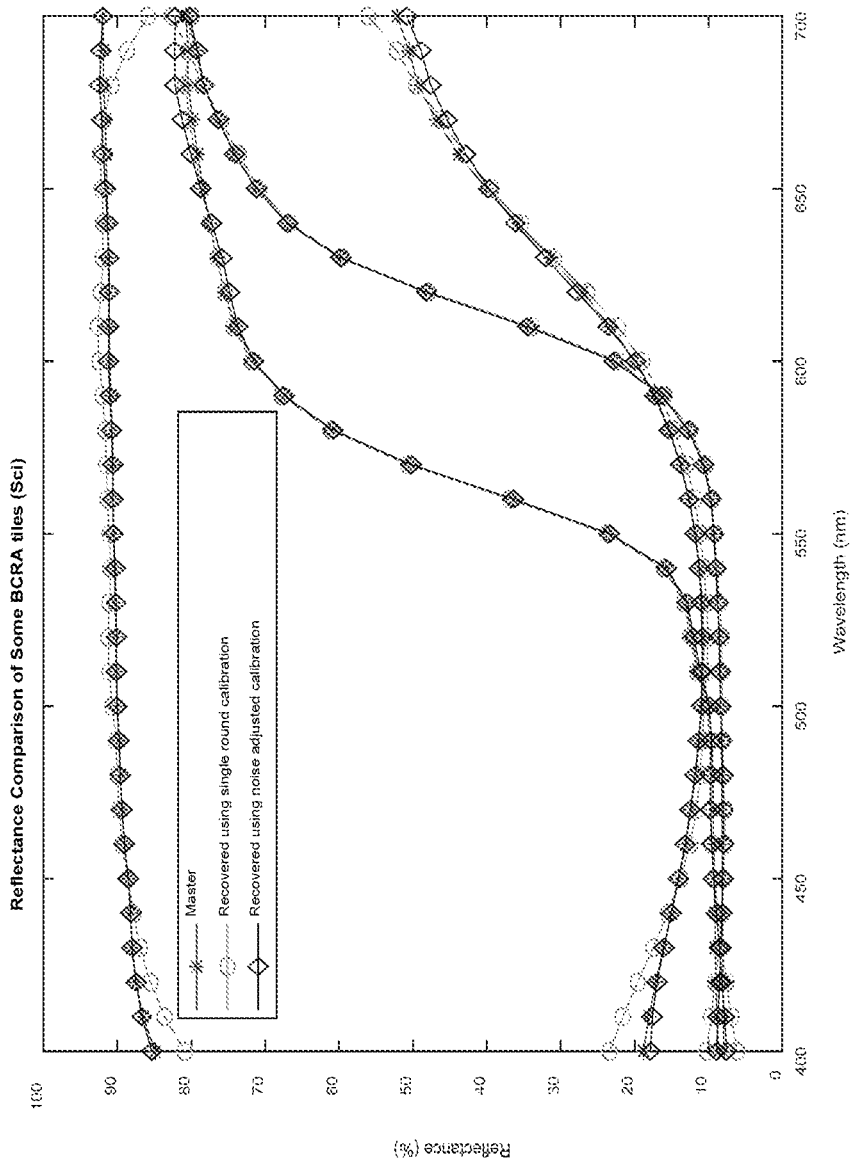
FIG. 5 is a graph detailing the reflectance comparison of one configuration of the calibration device.

Those possessing an ordinary level of skill in the art will appreciate that, as shown in the plot of FIG. 5, while calibration with single round of raw measurement data is unstable, a calibration with noise-adjusted single round of raw data can handle the noise well and recover the reflectance of the BCRA tiles much better than that of the pure single round result. Thus by concatenating repeated measurements with random noise added, the transformation matrix becomes more stable and the resulting recovered spectrum using vector T becomes more accurate.

As noted, the present systems, methods and apparatus, described herein provide an improvement over the art of color measurement. According to the features and disclosures provided, a color sensor, when used in combination with multiple light sources, can achieve a measurement result that improves upon the results achievable with a measurement device having a limited the number of wavelength channels. Furthermore, by using single round of both master calibration measurement data and device calibration measurement data, and introducing random noise into the calibration data, allows for a more robust and stable transformation matrix. This in turn allows for a more accurate color spectrum recovery. Such improvements in the art of color measurement are not routine or customary approaches and serve to solve a technical problem that exists in the art.

By way of further example, the presently described approach can be compared to alternative approaches for obtaining recovered spectrum information. For example, the advantage of the dual matrix approach described herein can be quantified relative to other approaches to recover spectrum data.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A color measurement system comprising:
   at least one illuminant configured to produce a light beam having a spectral power distributions (SPD) at a sample;
   a color measurement device configured to receive, on a light sensing portion thereof, light produced by the at least one illuminant that has been reflected off of the sample; and
   one or more processors having a memory and configured to receive an output signal from the color measurement device, and calculate a recovered reflectance spectrum of the sample using at least an output signal generated when the sample is illuminated by the at least one illuminant, wherein the recovered reflectance spectrum is calculated by generating a sample vector using the data output from the color measurement device and a vector offset calibration value, and obtaining the product of the sample vector and a calibration value,
   wherein the calibration value is a matrix calculated using at least a matrix of concatenated device calibration matrices and at least a matrix of concatenated control calibration matrices, wherein the concatenated device calibration matrices includes an unperturbed measurement matrix of measurements made of a collection of calibration standards, and at least one perturbed device measurement matrix corresponding to at least one row of the unperturbed measurement matrix with noise added to the unperturbed measurement matrix.

2. The system of claim 1 wherein the concatenated device calibration matrices includes a matrix offset calibration value at the end of each row of the respective device calibration matrices.

3. The system of claim 2, wherein the vector offset calibration value included at the end of each row of the respective matrices is 1.

4. The system of claim 1, wherein a difference in the measurement value for a given element of the unperturbed matrix and a corresponding element of the perturbed measurement matrix is less than 1% of the measurement value.

5. The system of claim 3, wherein the noise is added each measurement value of at least one row of the unperturbed measurement matrix.

6. The apparatus of claim 2, wherein the concatenated matrices are represented by S $$S = \begin{pmatrix} s_{1,1} & \cdots & s_{1,n} & W \\ \vdots & \ddots & \vdots & \vdots \\ s_{m,1} & \cdots & s_{m,n} & W \\ x_{1,1} & \cdots & x_{1,n} & W \\ \vdots & \ddots & \vdots & \vdots \\ x_{m,1} & \cdots & x_{m,n} & W \end{pmatrix},$$

$s_{m,n}$ is the sensor reading of tile m at channel n in a round of measurements of a plurality of calibration tiles, and $x_{m,n}$ is the same sensor reading of $s_{m,n}$ with random noise added to each measurement value, and W is a constant.

7. The apparatus of claim 6, wherein W is greater than or equal to 1.

8. The apparatus of claim 5, wherein the measurement matrix M is calculated according to:

$$M = \text{pinv}(S) * R$$

where, R corresponds to:

$$R = \begin{pmatrix} r_{1,1} & \cdots & r_{1,p} \\ \vdots & \ddots & \vdots \\ r_{m,1} & \cdots & r_{m,p} \\ r_{1,1} & \cdots & r_{1,p} \\ \vdots & \ddots & \vdots \\ r_{m,1} & \cdots & r_{m,p} \end{pmatrix}$$

where $r_{m,p}$ is the reflectance of a plurality of calibration tiles m at wavelength p obtained using a master measurement device.

9. The apparatus of claim 8, wherein the master measurement device has more wavelength channels than the light sensing portion of the color measurement device.

10. The apparatus of claim 8, wherein the matrix R was obtained from a measurement device having a number of wavelength channels that is less than or equal to about 31 spectral channels.

11. The apparatus of claim 8, wherein a reflectance spectrum r of the sample is calculated according to:

$$R_{convert} = (v_1 \ldots v_p) = T*M,$$

where, T is a measurement vector and M is the measurement calibration matrix.

12. The apparatus of claim 1, further comprising a remote computing device configured to communicate with the color measurement device and receive the calculated recovered reflectance spectrum of the sample.

13. A method for identifying the color properties of a sample, the method comprising:
   capturing, using a sample color sensing device, a sample measurement value of a sample under analysis under at least one illuminant;
   generating, using at least one processor having memory and configured to execute code, a recovered color value for the sample using at least the sample measurement value and a calibration value, wherein the calibration value is a matrix derived using at least a matrix of concatenated calibration matrices and a matrix of concatenated master calibration matrices, wherein each of the matrix of concatenated calibration matrices includes a first measurement matrix of measurements of a plurality of reference tiles under at least one illuminant and a second measurement matrix generated by adding random noise to each element of at least one row of the first measurement matrix of measurements wherein each of the concatenated calibration matrices includes a constant value representing an offset calibration; and
   outputting at least the calculated color properties.

14. The method of claim 13, wherein the recovered color value for the sample is calculated according to:

$$R_{calculated} = T*M$$

where T is a sample measurement vector of the sample measurements obtained and M is a calibration matrix.

15. The method of claim 13, wherein the concatenated matrices are obtained by capturing, using a calibration color sensing device having the same number of wavelength channels as the sample color sensing device, the measurement values for the first measurement matrix under at the at least one illuminant, and generating a second measurement matrix by adding to at least one row of the first measurement matrix a constant numerical value.

16. The method of claim 14, wherein the calibration matrix M is derived according to:

$$M = \text{pinv}(S)*R$$

where, S is a matrix of concatenated calibration matrices and R is a matrix of concatenated master calibration matrices.

17. The method of claim 13, wherein generating the recovered color value further comprises accessing the master calibration matrices from a memory remote to the processor.

* * * * *